US007743234B2

(12) United States Patent
Bohizic et al.

(10) Patent No.: US 7,743,234 B2
(45) Date of Patent: Jun. 22, 2010

(54) FACILITATING COMMUNICATION WITHIN AN EMULATED PROCESSING ENVIRONMENT

(75) Inventors: Theodore J. Bohizic, Hyde Park, NY (US); George A. Darling, Wappingers Falls, NY (US); Mark H. Decker, Rhinebeck, NY (US); Viktor S. Gyuris, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 11/694,155

(22) Filed: Mar. 30, 2007

(65) Prior Publication Data

US 2008/0244570 A1  Oct. 2, 2008

(51) Int. Cl.
*G06F 12/00* (2006.01)
(52) U.S. Cl. ...................................................... 712/225
(58) Field of Classification Search ........................ None
See application file for complete search history.

(56) References Cited

U.S. PATENT DOCUMENTS

| | | | | |
|---|---|---|---|---|
| 5,088,033 A | * | 2/1992 | Binkley et al. | 703/24 |
| 5,129,064 A | * | 7/1992 | Fogg et al. | 703/25 |
| 5,727,217 A | * | 3/1998 | Young | 710/260 |
| 5,758,124 A | * | 5/1998 | Ogata et al. | 703/27 |
| 7,177,791 B1 | * | 2/2007 | Crandall et al. | 703/25 |
| 7,389,291 B1 | * | 6/2008 | Shavit et al. | 707/8 |
| 7,529,886 B2 | * | 5/2009 | Emmes et al. | 711/114 |
| 2003/0093649 A1 | | 5/2003 | Hilton | 712/41 |
| 2005/0033925 A1 | * | 2/2005 | Wilson et al. | 711/133 |
| 2005/0228918 A1 | * | 10/2005 | Kriegel | 710/260 |

OTHER PUBLICATIONS

Smith, James & Ravi Nair, "Virtual Machines—Versatile Platforms for Systems and Processes," Morgan Kaufmann Publishers, 2005, pp. 27-82, 114-133, 304-320.
"z/Architecture—Principles of Operation," IBM Publication No. SA22-7832-04, 5th Edition, Sep. 2005.

* cited by examiner

*Primary Examiner*—Eric Coleman
(74) *Attorney, Agent, or Firm*—John E. Campbell; Blanche E. Schiller, Esq.; Heslin Rothenberg Farley & Mesiti P.C.

(57) ABSTRACT

Communication between processors and I/O communications processes is facilitated. During the communication, shared control blocks and input/output queues are updated without using locks. Instead, a lockless capability is provided to update the queues and control blocks, thereby enhancing system performance and minimizing the need for recovery processes.

23 Claims, 11 Drawing Sheets

US 7,743,234 B2

FACILITATING COMMUNICATION WITHIN AN EMULATED PROCESSING ENVIRONMENT

TECHNICAL FIELD

This invention relates, in general, to facilitating communication within a processing environment, and in particular, to facilitating communication between emulated processes of an emulated processing environment.

BACKGROUND OF THE INVENTION

Communication between different entities of a processing environment is managed in order to efficiently perform the communication and to preserve data integrity. Typically, this management includes the locking of data structures used in communicating between the entities. For instance, in the z/Architecture®, offered by International Business Machines Corporation, Armonk, N.Y., a processor and an input/output (I/O) communications process, such as a subchannel process, use shared control blocks and queues to communicate with one another. When these data structures are updated, locks are used to ensure only one update occurs at a time.

While locking is effective in serializing operations and protecting the data, there are disadvantages associated with locking. As examples, locking causes severe performance problems and requires recovery procedures.

SUMMARY OF THE INVENTION

Based on the foregoing, a need exists for a capability that facilitates communication without requiring locks. In particular, a need exists for a capability that enables shared data structures used during communication to be updated without using locks.

The shortcomings of the prior art are overcome and additional advantages are provided through the provision of an article of manufacture that includes at least one computer usable medium having computer readable program code logic to facilitate communication within a processing environment. The computer readable program code logic when executing performing, for instance, the following: initiating communication between a processor and an input/output (I/O) process; and communicating between the processor and the I/O process, wherein the communicating comprises at least one of updating shared information absent use of a lock and enqueuing information on a queue absent use of a lock.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for facilitating communication between a processor and an I/O communications process. In one example, the capability is employed in an emulated processing environment in which the processor is an emulated central processing unit process and the I/O communications process is an emulated I/O communications process. In a further example, the architecture being emulated is the z/Architecture® offered by International Business Machines Corporation, Armonk, N.Y., and the emulated I/O communications process is an emulated subchannel process.

Figure 1:
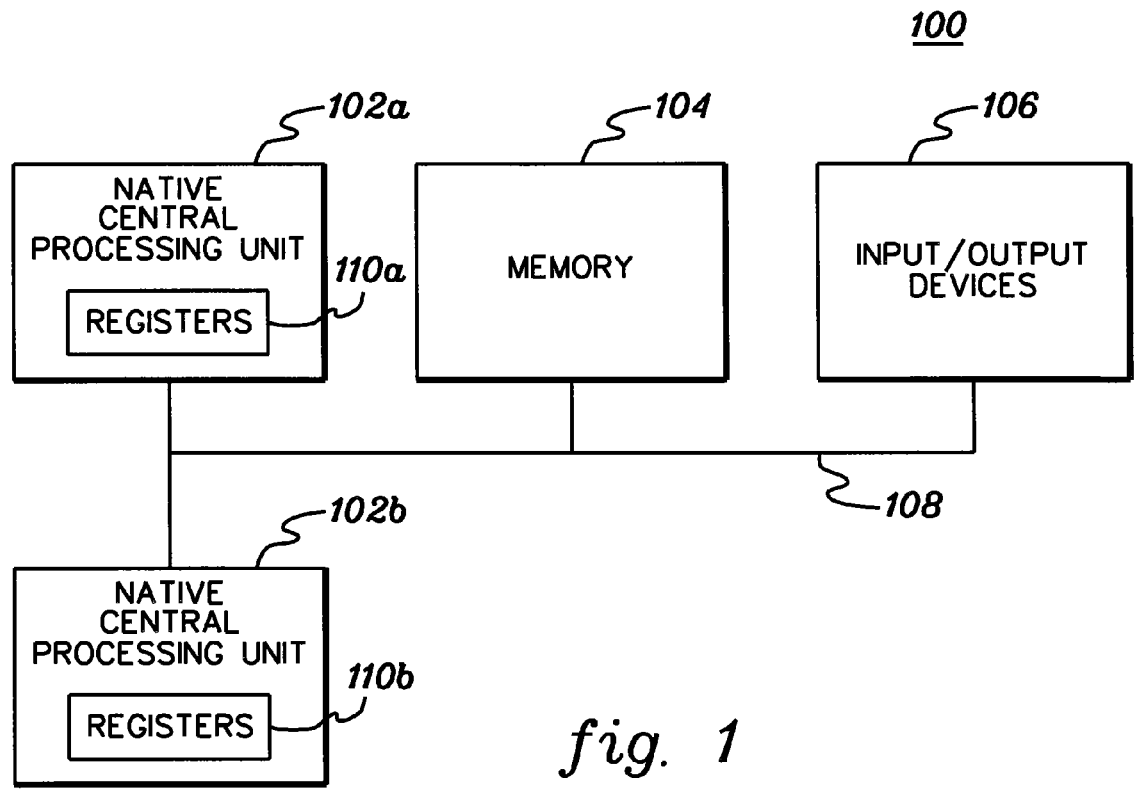
FIG. 1 depicts one embodiment of a processing environment to incorporate and use one or more aspects of the present invention.

One embodiment of a processing environment to incorporate and use one or more aspects of the present invention is described with reference to FIG. 1. Processing environment 100 includes, for instance, a plurality of native processors 102 (e.g., central processing unit (CPU) 102a, 102b), a memory 104 (e.g., main memory) shared by the plurality of processors (collectively referred to as processors 102) and one or more input/output (I/O) devices 106 accessible to the plurality of processors. The processors, memory and I/O devices are coupled to one another via, for example, one or more buses 108.

In this example, each processor is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety. As examples, processor 102 is a part of a pSeries® server offered by International Business Machines Corporation (IBM®), Armonk, N.Y. IBM®, pSeries® Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Each native central processing unit 102 includes one or more native registers 110 (e.g., 110a, 110b, collectively referred to as native registers 110), such as one or more general purpose registers and/or one or more special purpose registers, used during processing within the environment. These registers include information that represent the state of the environment at any particular point in time.

To provide emulation, the processing environment is created to include at least one emulator, at least one guest operating system and one or more guest applications. In particular, one or more of the processors can provide emulation, host a guest operating system and execute one or more guest applications. These features are further described with reference to FIG. 2.

Figure 2:
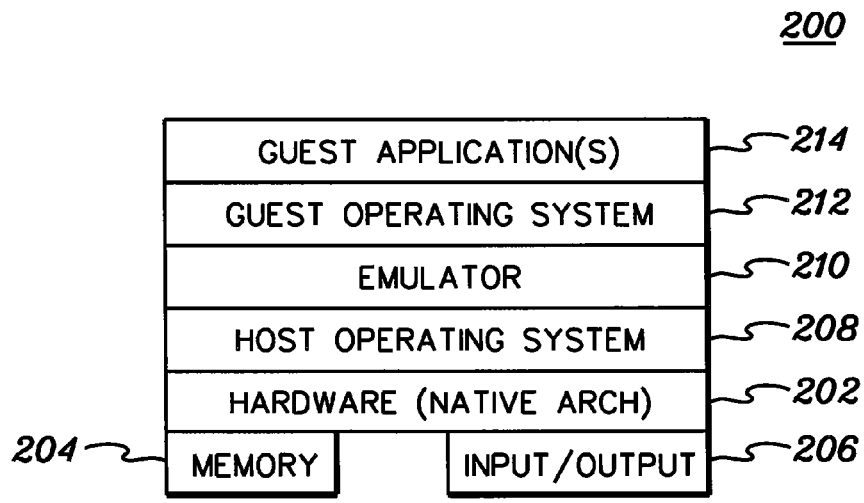
FIG. 2 depicts one embodiment of a system architecture of the processing environment of FIG. 1, in accordance with an aspect of the present invention.

Referring to FIG. 2, one embodiment of a system architecture 200 of processing environment 100 is described. System architecture 200 includes, for instance, a plurality of implementation layers, which define the architected aspects of the environment. In this particular example, the layers include hardware 202, which is coupled to memory 204 and input/output devices and/or networks 206 via one or more interfaces and/or controllers. In this example, each processor 102a, 102b includes hardware layer 202, but memory 204 and I/O devices 206 are shared, as depicted in FIG. 1.

Returning to FIG. 2, architecture 200 further includes a host operating system 208; an emulator 210; a guest operating system 212; and one or more guest applications 214; as examples. One layer is coupled to at least one other layer via one or more interfaces. For instance, guest applications 214 are coupled to guest operating system 212 via at least one interface. Other interfaces are used to couple the other layers. Moreover, the architecture can also include other layers and/or interfaces. Again, each processor may have a host operating system and provide emulation. Each processor may host a guest operating system and one or more guest applications. Various of the layers depicted in FIG. 2 are further described below.

Hardware 200 is the native architecture of the processing environment and is based on, for instance, Power4, PowerPC®, Intel®, or other architectures. Running on the hardware is a host operating system 208, such as AIX® offered by International Business Machines Corporation, or LINUX. AIX® is a registered trademark of International Business Machines Corporation, Armonk, N.Y.

Emulator 210 includes a number of components used to emulate an architecture that differs from the native architecture. In this embodiment, the architecture being emulated is the z/Architecture® offered by International Business Machines Corporation, but other architectures may be emulated as well. The emulation enables a guest operating system 212 (e.g., z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
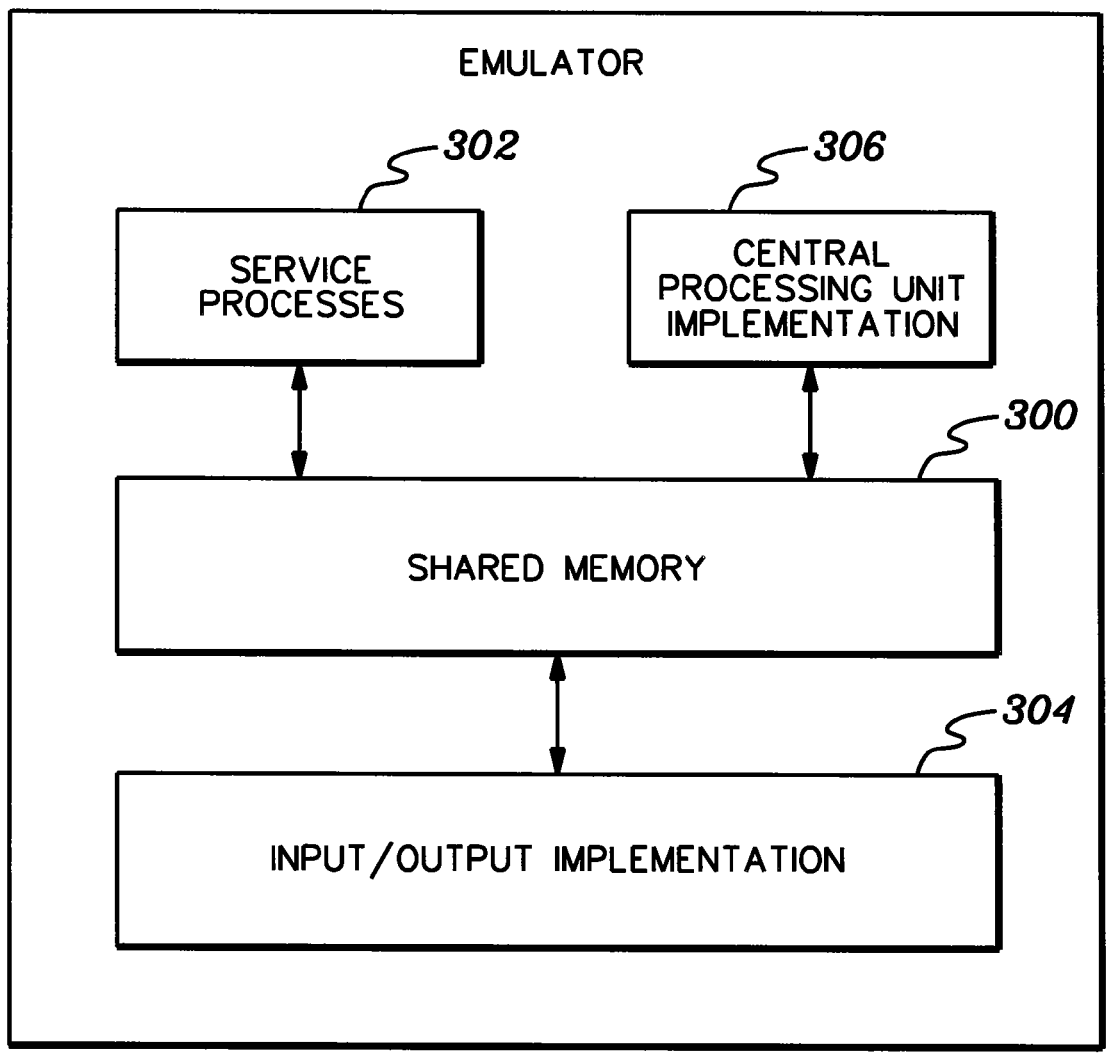
FIG. 3 depicts further details of one embodiment of an emulator of the system architecture of FIG. 2, in accordance with an aspect of the present invention.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery.

Central processing unit (CPU) implementation 306 includes one or more emulated CPU processes, and is responsible for executing instructions and managing the processing. It includes a number of components, which are described with reference to FIGS. 4A-4B.

Figure 4A:
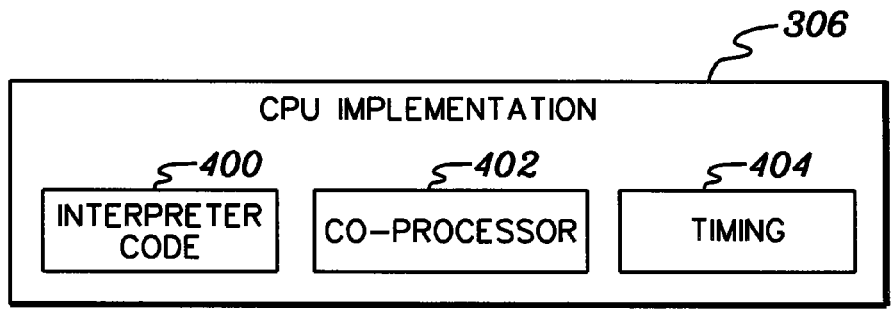
FIG. 4A depicts further details of one embodiment of a central processing unit (CPU) implementation of the emulator of FIG. 3, in accordance with an aspect of the present invention.
Figure 4B:
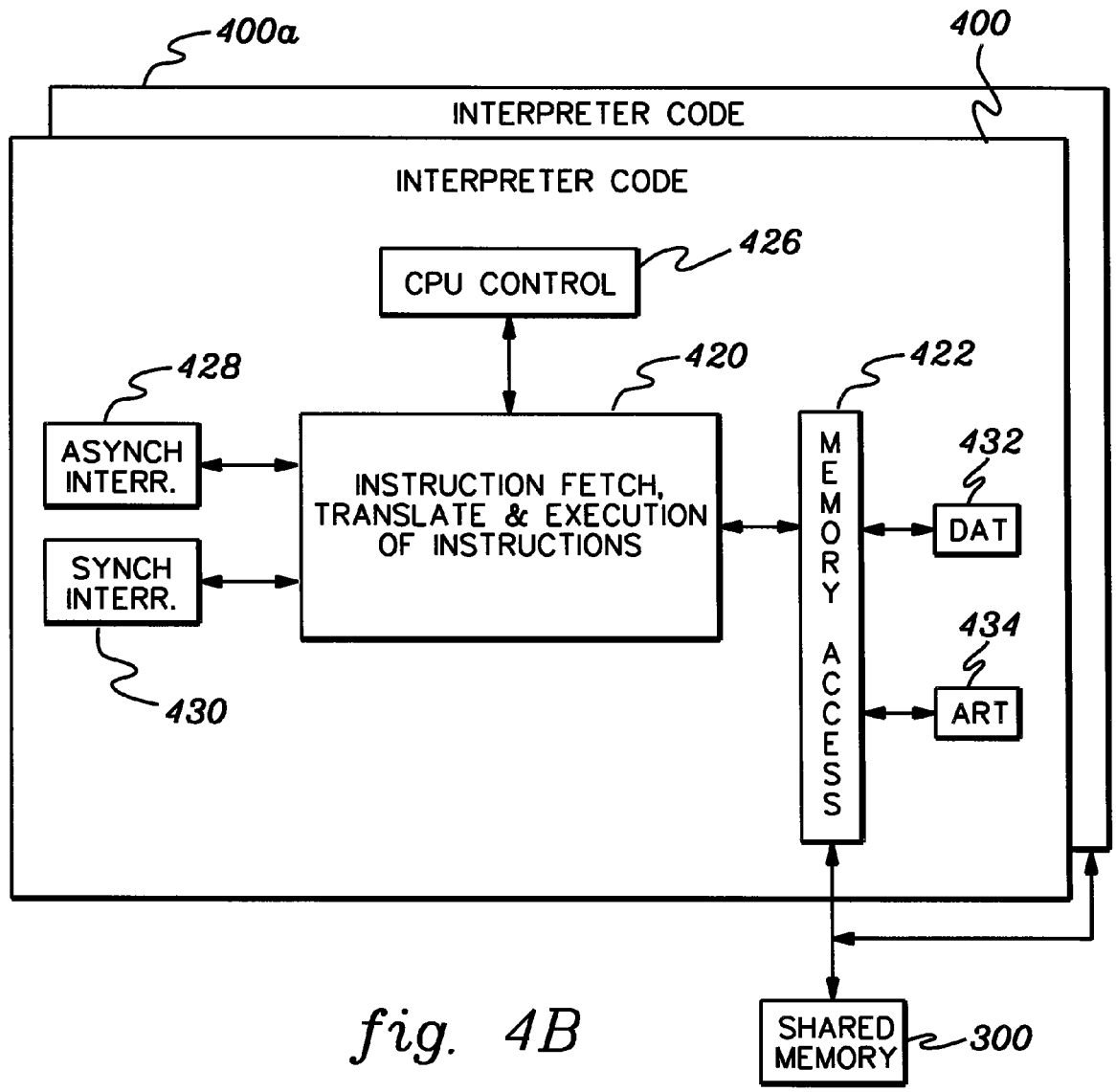
FIG. 4B depicts further details of one embodiment of interpreter code of the CPU implementation of FIG. 4A, in accordance with an aspect of the present invention.

Referring to FIG. 4A, CPU implementation 306 includes, for instance, interpreter code 400 used to obtain, translate and execute instructions; an architectured co-processor 402 that aids in initial start-up and communication with the chip (e.g., Service Call Logical Processor (SCLP) processes); and timing facilities 404 that are responsible for timing functions of the emulator. Further details regarding interpreter code 400 are described with reference to FIG. 4B.

Interpreter code 400 includes, for instance, an interpretation unit 420 coupled to a memory access unit 422, a CPU control 426, an asynchronous interruption handler 428 and a synchronous interruption handler 430. In this example, each processor includes interpreter code, and thus, an interpreter code 400a is represented. Additional processors may or may not have interpreter code 400.

Interpretation unit 420 is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

In a further example, the providing includes creating during, for instance, a translation process, a native stream of instructions for a given set of guest instructions. This includes identifying the functions and creating the equivalent native instructions.

If an instruction includes a memory access, then memory access routines 422 are used to access shared memory 300. The memory access routines may use translation mechanisms, such as dynamic address translation (DAT) 432 or access register translation (ART) 434, to translate a logical address to an absolute address, which is then used to access the memory or may be further translated, if needed.

In this embodiment, the processing within interpretation unit 420 is to be streamlined. Thus, if a more complicated circumstance arises, such as a wait state, or changing from one architecture level to another architecture level (e.g., z/Architecture® to ESA/390, etc.), control is transferred to CPU control 426, which handles the event and then returns control to interpretation unit 420.

Moreover, if an interrupt occurs, then processing transitions from interpretation unit 420 to either asynchronous interruption handler 428, if it is an asynchronous interruption, or synchronous interruption handler 430, if it is a synchronous interruption. After the interrupt is handled, processing returns to interpretation unit 420.

In particular, the interpretation unit monitors certain locations in shared memory and if a location has changed, it signifies an interrupt has been set by one of the CPUs or I/O. Thus, the interpretation unit calls the appropriate interruption handler.

Returning to FIG. 3, a central processing unit process of CPU implementation 306 and an emulated input/output process of I/O implementation 304 communicate with one another via shared memory 300. This communication is further described with reference to FIG. 5. Reference will continue to be made to FIG. 3, also. Thus, reference numbers beginning with a "3" are found in FIG. 3, and reference numbers beginning with a "5" are found in FIG. 5.

Figure 5:
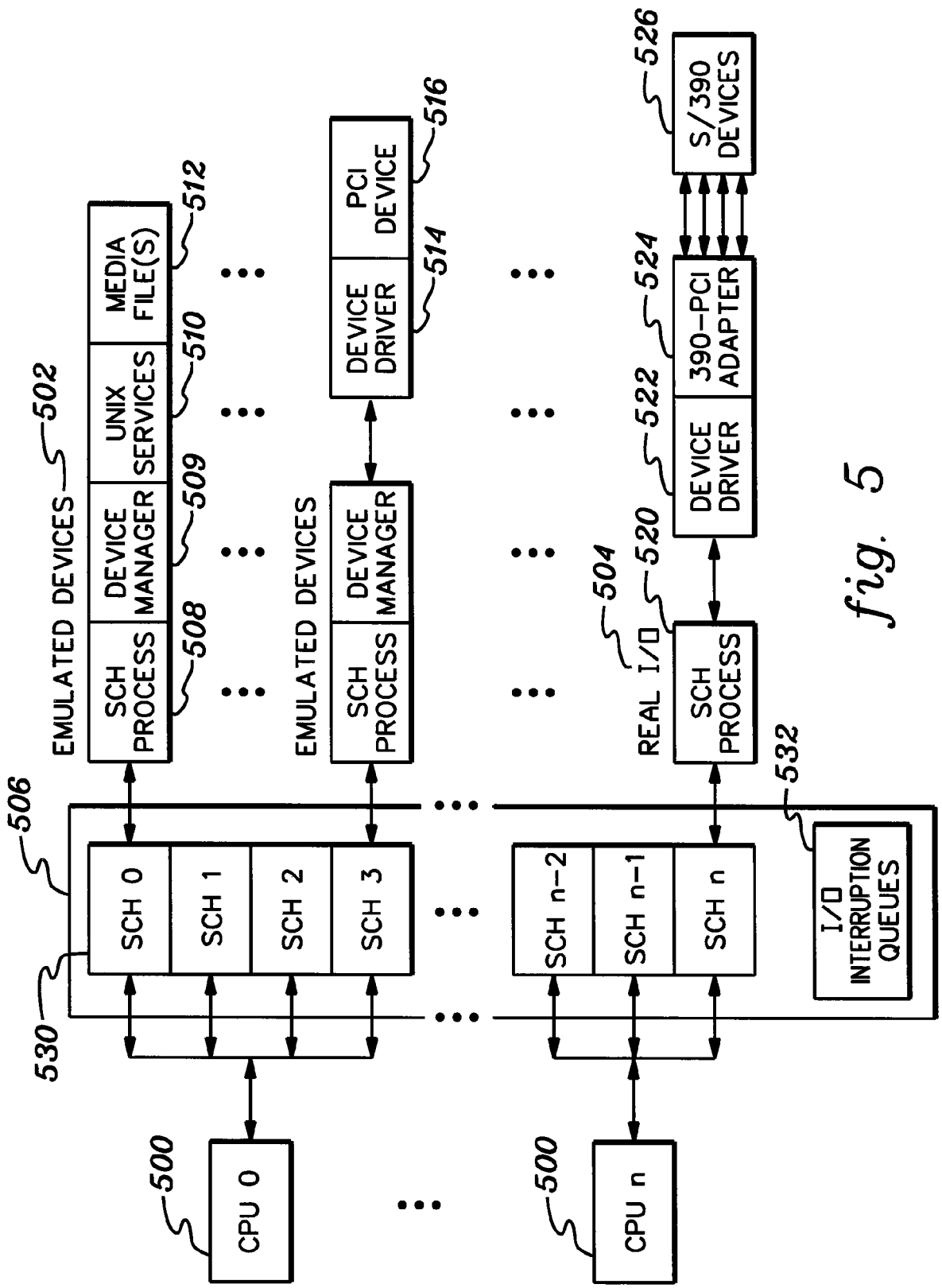
FIG. 5 depicts one embodiment of an overview of the control blocks and queues used during communication between a central processing unit and one or more input/output processes, in accordance with an aspect of the present invention.

Referring to FIGS. 3 and 5, in this particular example, central processing unit implementation 306 includes a plurality of central processing unit processes 500. One or more of these processes communicate with one or more emulated devices 502 and/or real I/O devices 504 via a portion of shared memory 506. Emulated devices 502 and real I/O devices 504 are a part of I/O implementation 304. Emulated devices 502 include subchannel processes 508, device managers 509, Unix services 510, media files 512, device drivers 514 and/or PCI devices 516, as examples. Real I/O devices 504 include subchannel processes 520, device drivers 522, 390-PCI adapters 524 and/or S/390 devices 526, as examples.

Shared memory 506 includes one or more control blocks 530 and one or more I/O interruption queues 532 for facilitating communication between CPU processes 500 and emulated devices 502 or real I/O devices 504. The control blocks and queues are shared by a plurality of processes. In one example, control blocks 530 include a plurality of subchannel control blocks, each including various information, as described with reference to FIG. 6A.

Figure 6A:
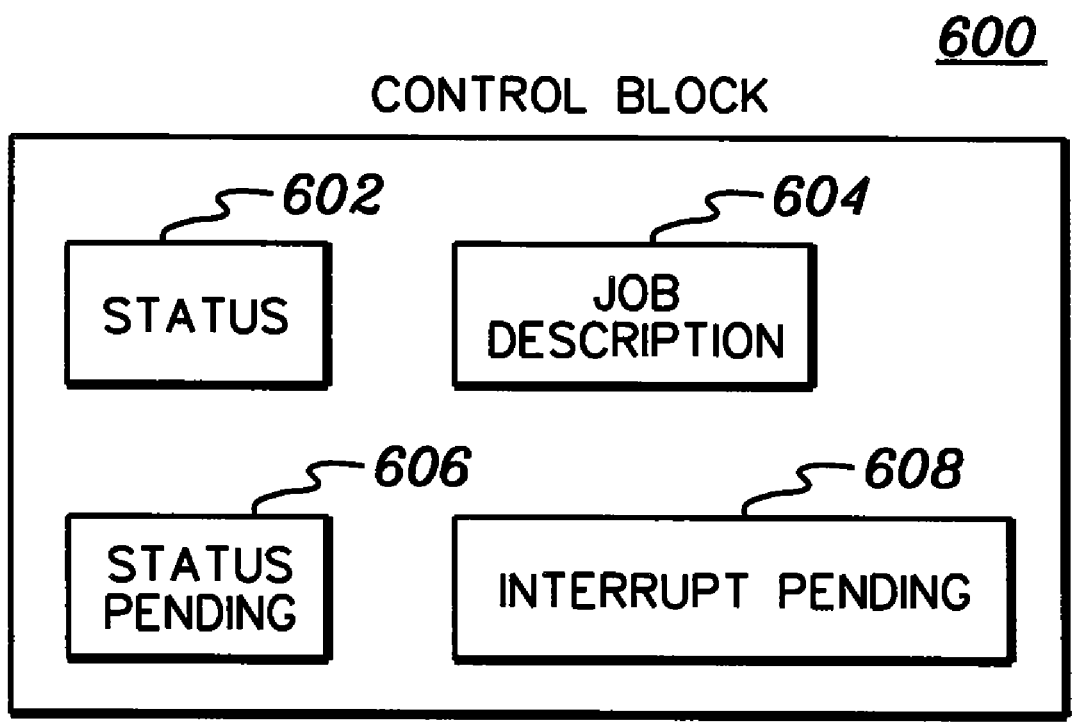
FIG. 6A depicts further details of one embodiment of a control block used during the communications, in accordance with an aspect of the present invention.
Figure 6B:
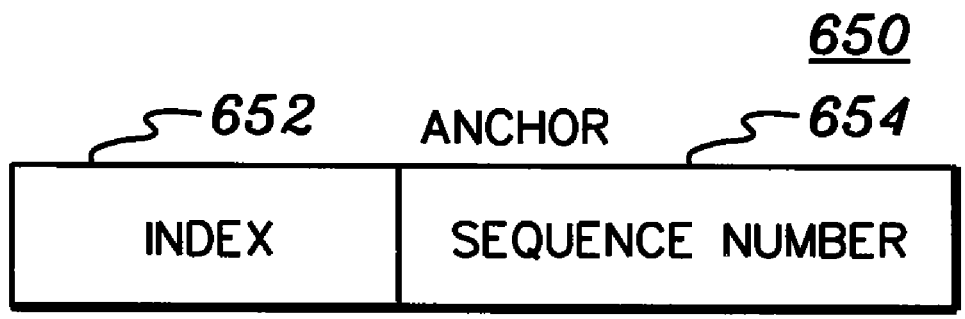
FIG. 6B depicts one embodiment of an anchor for the control block of FIG. 6A, in accordance with an aspect of the present invention.

Referring to FIG. 6A, a control block 600 (e.g., a subchannel control block) maintains status information 602, a description of the jobs or operations to be performed 604, a status pending indicator 606, and a plurality of interrupt pending indicators 608. In one example, there are eight interrupt pending indicators, one for each available I/O interruption queue.

A control block is associated with each subchannel. That association is achieved using an anchor 650, which includes a control block index 652 and a sequence number 654. The sequence number is a unique number used to avoid confusion, since the memory containing the control block can be reused for the same subchannel. In this particular example, the index, rather than an address, is used because the application is a 64-bit application and the architecture does not perform an atomic operation for larger than a double word. In other embodiments, addresses or other indications may be used. The anchor is, for instance, a double word.

In one example, the control blocks associated with subchannels are selected from an array of control blocks using the index field of the anchor. The number of control blocks allocated is twice the number of possible subchannels plus one for each CPU. However, in other embodiments, different numbers of subchannel control blocks may be allocated.

Figure 7:
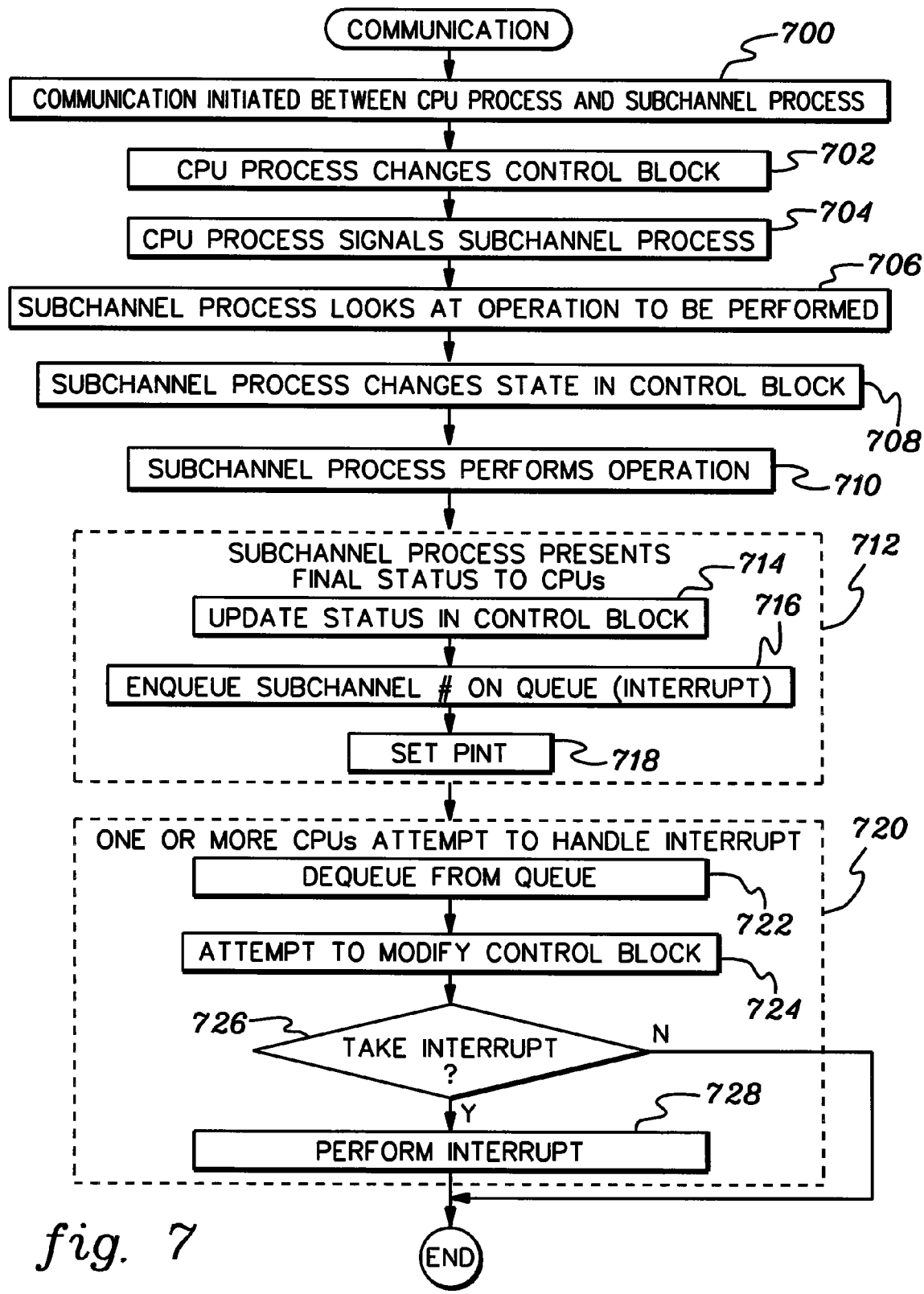
FIG. 7 depicts one embodiment of the logic associated with communicating between a processor and an I/O communications process, in accordance with an aspect of the present invention.

The use of a control block in communication between a processor and an I/O communications process, such as between an emulated central processing unit process and an emulated subchannel process, is described with reference to FIG. 7. In particular, FIG. 7 depicts one embodiment of the logic associated with communicating between a CPU process and a subchannel process. Although in the examples described herein the communication is between an emulated CPU process and an emulated subchannel process, in other embodiments, the communication may be between other types of processes, including emulated and/or non-emulated processes, and/or other types of entities.

Referring to FIG. 7, a communication is initiated between a central processing unit process and a subchannel process, STEP 700. For example, a CPU process initiates a Start Subchannel instruction to start a subchannel designated in the instruction. The initiating of this operation causes the CPU to update a control block associated with the subchannel, STEP 702. In particular, the subchannel control block is revised to provide information regarding the operation to be performed (e.g., start) and the parameters needed in order to perform this operation. For instance, information in an operation request block (ORB) specified in the Start Subchannel instruction is placed in the subchannel control block.

Additionally, the CPU process signals the subchannel process to look at the control block, STEP 704. In one example, a Unix signal is provided in order to alert the subchannel that its control block has been updated.

In response to the signaling, the subchannel process wakes up and looks at the operation it is to perform by reading the control block, STEP 706. The subchannel process updates the state in the control block (e.g., status 602) to indicate that an operation is in progress, STEP 708. Further, it performs the operation, STEP 710.

In response to completing the operation, the subchannel process presents final status to the central processing units of the environment, STEP 712. This includes, for instance, updating status in the control block to set the status pending indicator (606) and the appropriate pending interrupt indicator (608), STEP 714, enqueuing a subchannel number on an I/O interrupt queue assigned by the operating system, STEP

716, and setting an indicator in one or more pending interrupt arrays (PINT), STEP 718. In one example, the pending interrupt array includes an indicator for each of the queues. In this embodiment, there are eight queues, and therefore, eight pending interrupt indicators. Each CPU has a pending interrupt array in shared storage and the indicator is set in each of the arrays.

Subsequent to the subchannel process presenting the final status to the CPU processes, one or more of the CPU processes attempt to handle the interrupt, STEP 720. This includes, for instance, dequeuing the interrupt from the queue, STEP 722, and attempting to modify the control block to reset the interrupt pending indicator (608), STEP 724. Further, a determination is made as to whether the interrupt should be taken, INQUIRY 726. It is possible that an I/O process already handled the status, and thus, the interrupt is no longer needed. However, since the interrupt is in a FIFO queue, it may not be readily deletable from the queue. For instance, if it is in the middle of the queue, then it cannot be deleted until it comes to the head of the queue. Thus, when an interrupt is pulled from the head of the queue, a determination is made as to whether the interrupt still needs to be handled. To make this determination, the status of the subchannel is checked to see if it has been deleted. If it has been deleted, then the interrupt need not be handled.

If it is determined that the interrupt is to be taken, then the interrupt is performed, STEP 728. Thereafter, or if the interrupt is not to be taken, processing is complete.

As described above, in various steps of the communication process, the subchannel control block is updated. One embodiment of the logic associated with updating a control block is described with reference to FIG. 8. The control block is updated, in accordance with an aspect of the present invention, using a lockless capability. That is, the control block is efficiently and successfully updated without using locks.

Figure 8:
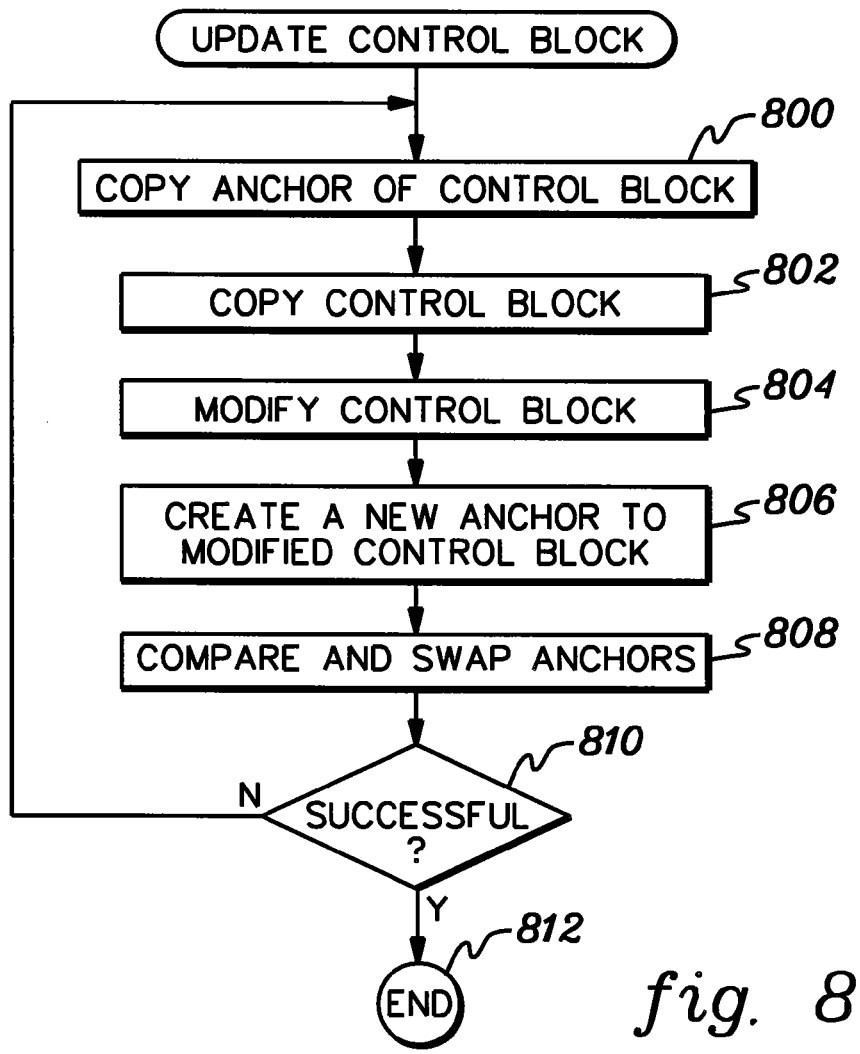
FIG. 8 depicts one embodiment of the logic associated with updating a control block, in accordance with an aspect of the present invention.

Referring to FIG. 8, in one embodiment of performing a lockless update of the control block, an anchor of the control block is copied, STEP 800. Additionally, the control block is copied to another control block selected from the array of control blocks that is not yet associated with a subchannel, STEP 802. Thereafter, the copy of the control block is modified, as desired, STEP 804. For instance, status is updated and/or an indicator is set. Further, a new anchor is created that is associated with the modified control block, STEP 810. The new anchor gets the next unique sequence number. The subchannel's anchor is compared with the copied anchor, and if the comparison is successful, then the new anchor is swapped in for the subchannel's anchor. Thus, the subchannel's anchor points to the new modified control block. The original control block is marked as unused and can be used in a further operation. If the compare and swap is unsuccessful, INQUIRY 810, then the process repeats, STEP 800. Otherwise, the updating of the control block is complete, STEP 812.

Figure 9:
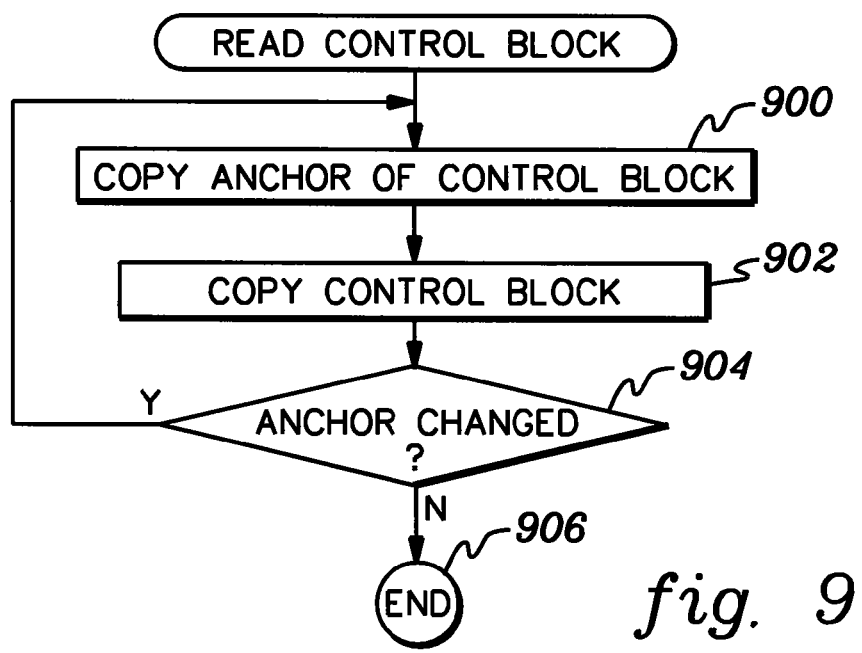
FIG. 9 depicts one embodiment of the logic associated with reading a control block, in accordance with an aspect of the present invention.

In addition to updating a control block, a control block can be interrogated. One embodiment of the logic associated with reading a control block is described with reference to FIG. 9. Initially, an anchor of the control block is copied, STEP 900. Further, the control block (e.g., payload) is copied, as described above, STEP 902. Thereafter, a determination is made as to whether the anchor has changed, INQUIRY 904. In particular, the original anchor is refetched using serialization and then compared to the copy. If there has been a change, then the process repeats, STEP 900. Otherwise, the read of the control block is complete, STEP 906.

It is possible that multiple processes will attempt to update a control block concurrently. In such a case, during the compare and swap, one or more of those processes fail, while only one process wins the race. The one process that wins the race successfully performs the compare and swap to complete the update. The other processes retry the operation.

In addition to updating a control block during communication, an interrupt is posted to an I/O interruption queue. There are, for instance, eight queues in the system and the assignment of a queue to a subchannel is made by the operating system. In one example, Queue 0 has the highest priority and Queue 7 has the lowest priority. Each queue is, for instance, a first-in, first-out (FIFO) queue, in which new elements (e.g., interrupts) are placed at the end of the queue (i.e., tail) and the oldest elements are at the head of the queue. The queue is implemented with a single linked list, as described with reference to FIG. 10A.

Figure 10A:
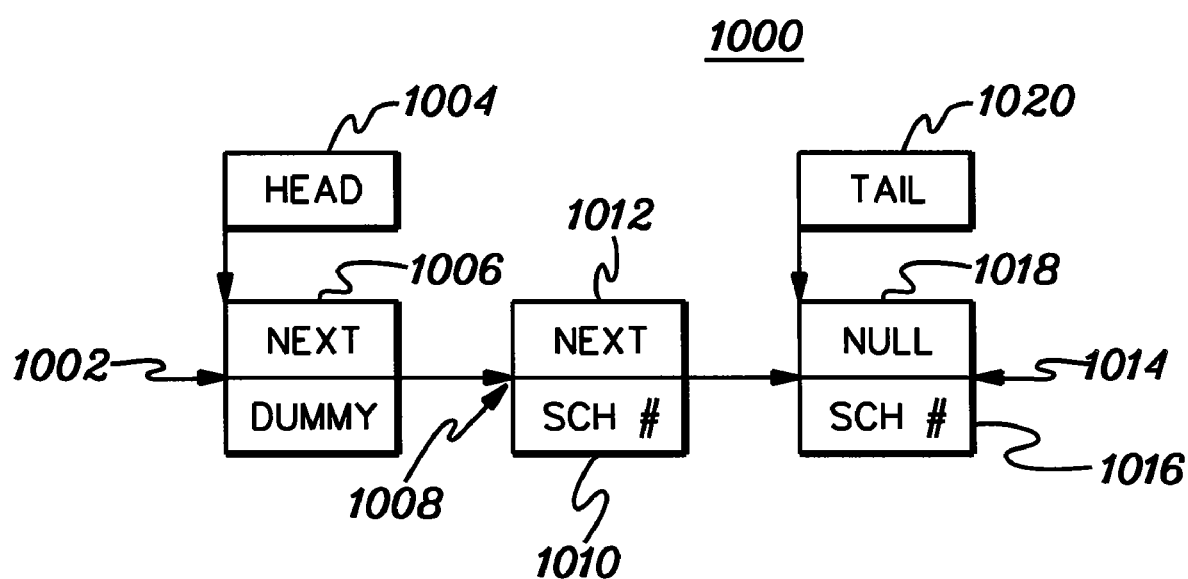
FIG. 10A depicts one embodiment of a queue used in accordance with an aspect of the present invention.

As shown in FIG. 10A, a queue 1000 includes a first element 1002, which is a dummy element pointed to by a head pointer 1004. The dummy element includes a next pointer 1006 that points to the next element on the queue. If there are no further elements on the queue, then the next pointer is equal to null. In this particular example, there is at least one additional element on the queue, and therefore, next pointer 1006 points to a next element 1008. This element includes a subchannel number 1010 and another next pointer 1012. Next pointer 1012 points to a further element 1014, which includes a subchannel number 1016 and a null next pointer 1018. Since the next pointer is null, there are no further elements on the queue, and therefore, a tail pointer 1020 points to element 1014.

In accordance with an aspect of the present invention, in order to update a queue using a lockless capability, multiple shared pointers (e.g., two pointers) are updated atomically and in the correct sequence. These pointers include, for instance, the next pointer and the tail pointer. The next pointer is to point to the newly allocated element and the tail pointer is advanced to the new element. Since adding to the tail requires two operations, other processes can observe these two pointers as being inconsistent. A process may be preempted after updating one pointer and before updating the other pointer making the window of inconsistency quite large. Typically, this situation is handled with a single lock and by disabling interrupts. This, however, is unacceptable for a multi-process system emulator executing in user mode where it cannot disable preemption. Thus, in accordance with an aspect of the present invention, a technique is used in which the two shared pointers are updated in the correct sequence using compare and swap operations. Then, a partial update can be completed by a different process which has observed the inconsistency.

As described herein, the next pointer within the last element on the list is interlock-updated first and then the tail pointer is advanced with an interlocked update. Another process can observe a partial update by noticing that the next pointer in the element located by the tail pointer is not zero. The subsequent process can attempt to advance the tail pointer via compare and swap using the next pointer within the element. If it is successful, then the chain will be in a consistent state. The original process which started the updated process will eventually try to update the tail pointer and fail. The failure can be assumed to be that some other process completed the operation.

Several processes may attempt to fix the inconsistency, but only one process succeeds. The inconsistency is checked during the enqueue and dequeue procedures. The enqueue checks because the first element may be in an inconsistent state.

Figure 10B:
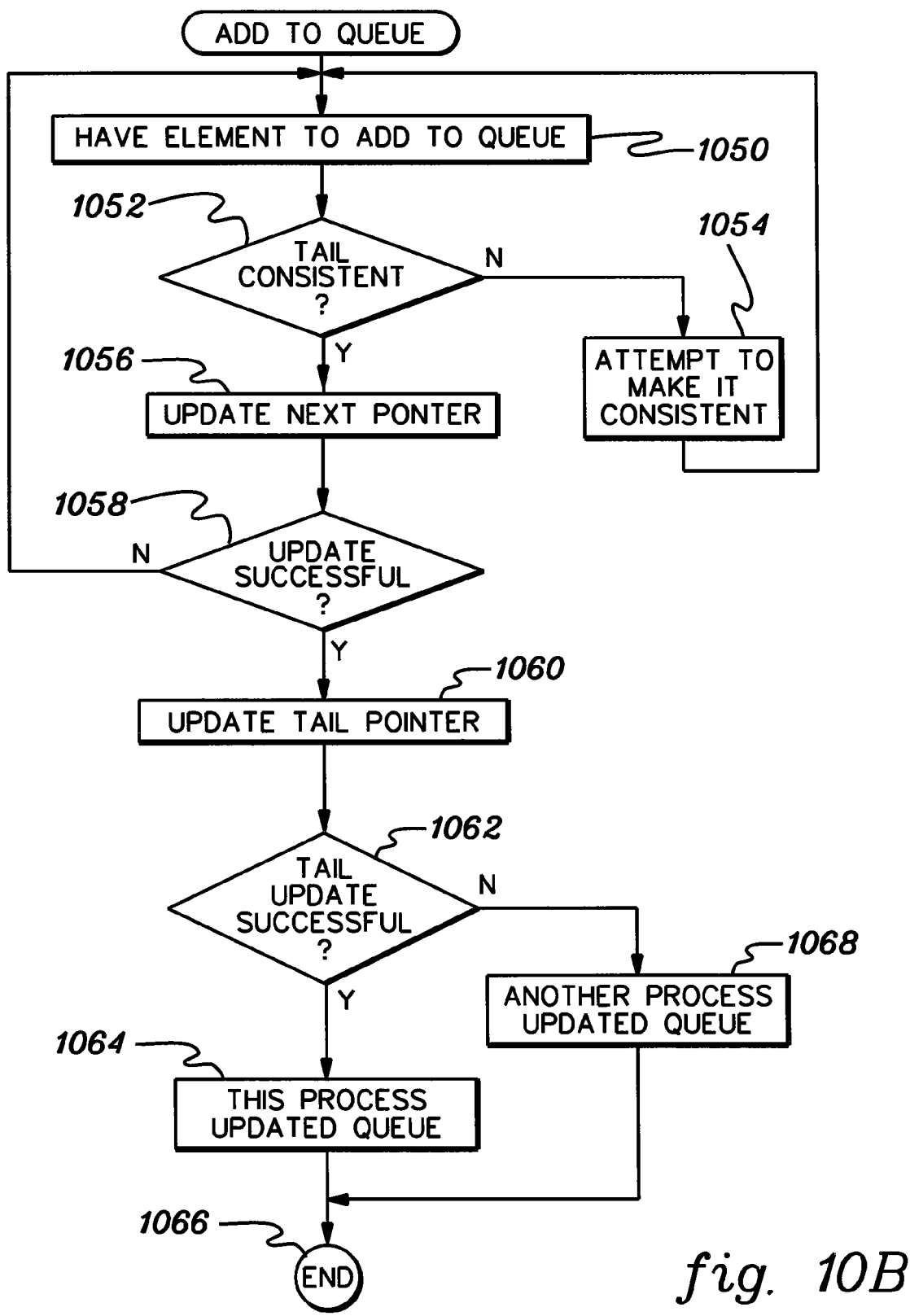
FIG. 10B depicts one embodiment of the logic associated with adding an element to a queue, in accordance with an aspect of the present invention.

One embodiment of the logic associated with updating the queue is described with reference to FIG. 10B. Referring to FIG. 10B, an element (e.g., an interrupt) is to be added to the queue, STEP 1050. Thus, a determination is made as to whether the tail of the queue is consistent, INQUIRY 1052. That is, is the tail pointing to an element having a null next pointer. If the tail is inconsistent, then an attempt is made to make it a consistent, STEP 1054. In particular, the tail pointer is moved to the next element and processing continues with STEP 1050. If the tail is consistent, then the next pointer is updated, STEP 1056. In particular, next pointer 1018 (FIG. 10A), which is currently null, is updated to next, and the next pointer points to the element being added. If this update is unsuccessful, INQUIRY 1058 (FIG. 10B), processing returns to STEP 1050. Otherwise, if the update is successful, the tail pointer is updated, STEP 1060. That is, tail pointer 1020 (FIG. 10A) is moved from element 1014 to the element being added.

Returning to FIG. 10B, thereafter, a determination is made as to whether the tail update is successful, INQUIRY 1062. If the update is successful, then this process successfully updated the queue, STEP 1064, and processing is complete, STEP 1066. However, if the update is not successful, INQUIRY 1062, this is not a problem, but instead indicates that another process successfully updated the queue, STEP 1068. Thus, processing continues at STEP 1066.

Figure 11:
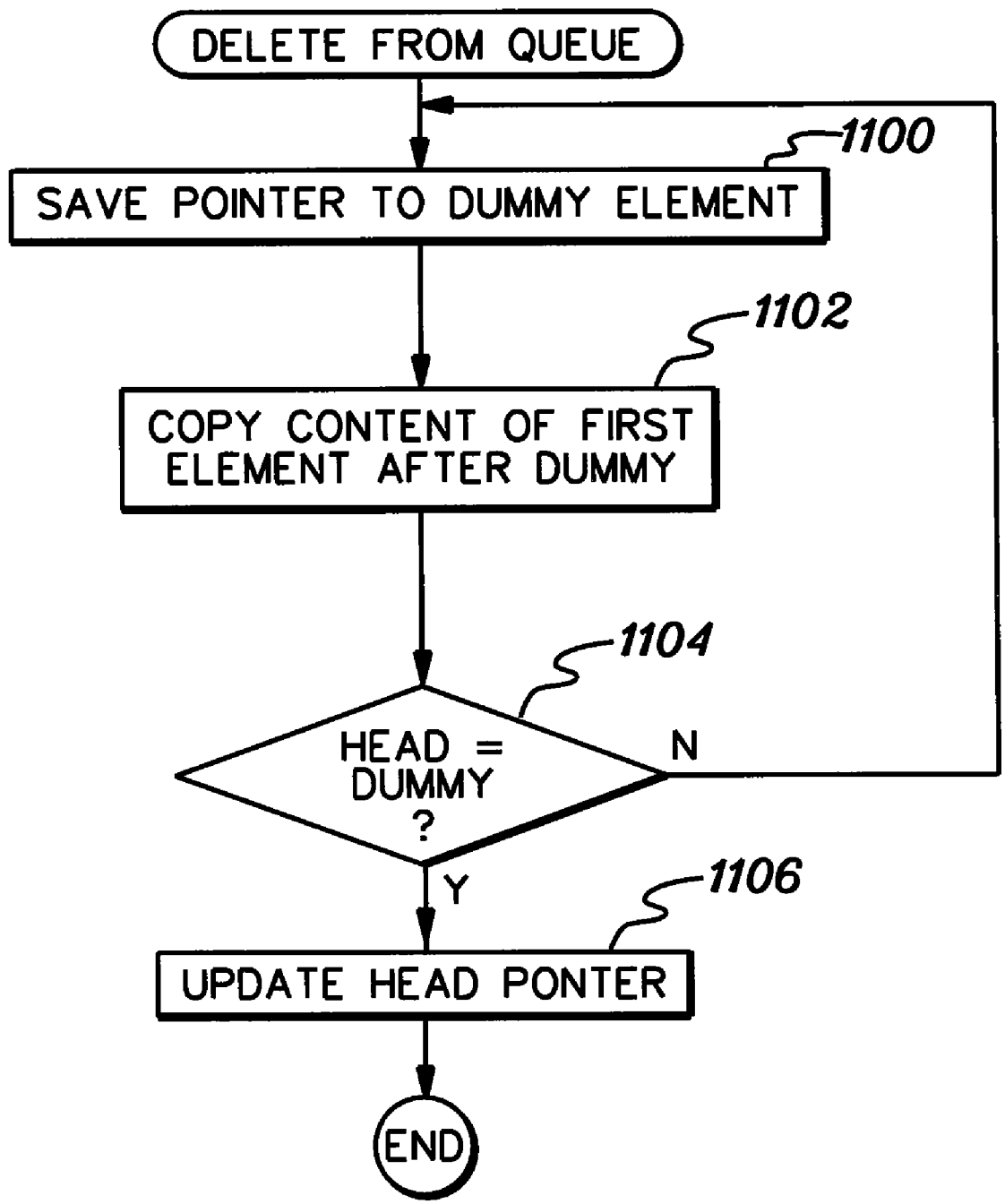
FIG. 11 depicts one embodiment of the logic associated with deleting an element from a queue, in accordance with an aspect of the present invention.

In addition to adding elements to the queue, an element may be deleted from a queue. For instance, an interrupt may be dequeued from the queue to be processed. One embodiment of the logic associated with deleting an element from the queue is described with reference to FIG. 11. Initially, the pointer to the dummy element is saved, STEP 1100. Thereafter, the content of the first element after the dummy is copied, STEP 1102. A determination is then made as to whether the head points to the dummy element, INQUIRY 1104. If the head does not point to the dummy element, then processing repeats with STEP 1100. Otherwise, the head pointer is updated, STEP 1106.

Described in detail above is a capability for communicating between a processor and an I/O communications process via a lockless mechanism. In particular, in one example, a capability is provided for communicating between emulated central processing unit processes and emulated subchannel processes without requiring locks and without requiring memory management.

Although one scenario is provided above for communicating between a processor and an I/O communications process, many situations may occur during that scenario which have to be handled. For example, it is possible that an I/O process will provide intermediate status to the CPU. Each time it updates status, it wants to tell the CPU via an interrupt. Thus, in accordance with an aspect of the present invention, the status is OR'd. This enables the CPU to be updated, but minimizes the number of interrupts that are provided. Take the following example: assume intermediate status is provided. The status pending bit is turned on and an enqueue is performed. If more intermediate status is provided, the subchannel process notices that the status is already pending, so it just OR's the additional status in the descriptor.

As a further example, assume that a CPU has eliminated the status pending (e.g., issues a Test Subchannel instruction). It is possible that the status is handled, but an element is still in the queue. That is why the interrupt pending field is handled separately. More status may still come in and then the queue entry is reused, so that the queue does not grow exponentially.

In yet another example, the subchannel, which is assigned to a queue, is moved from that queue, by the CPU, to a different queue, while an interrupt still exists on the previously assigned queue. Thus, there could be a situation in which there is an interrupt on multiple queues. Eventually, the CPU may enable for interruptions and the interruption will be presented to the CPU. If the queue which presents the interruption does not match the current assigned queue number, then the interruption is discarded.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 12:
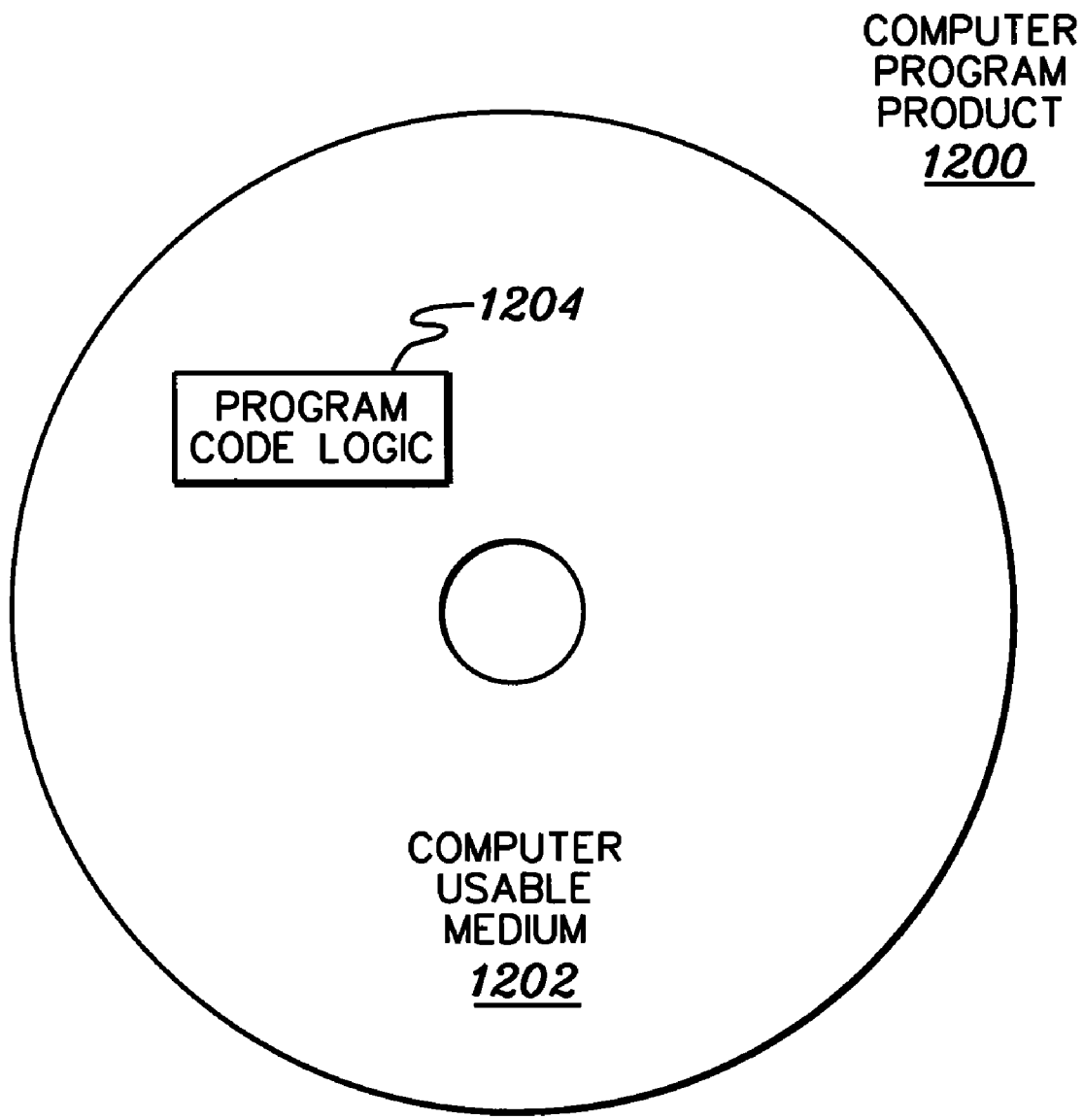
FIG. 12 depicts one embodiment of a computer program product incorporating one or more aspects of the present invention.

One example of an article of manufacture or a computer program product incorporating one or more aspects of the present invention is described with reference to FIG. 12. A computer program product 1200 includes, for instance, one or more computer usable media 1202 to store computer readable program code means or logic 1204 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided in which locks are avoided in communicating between a processor and I/O processes. That is, shared control blocks and queues are updated without using locks. This enhances performance and reduces the need for recovery when updating shared information and enqueuing/dequeuing I/O interruptions.

Although various embodiments are described above, these are only examples. For instance, the processing environment can include processing units that are based on architectures other than Power4, PowerPC® or Intel®. Additionally, servers other than pSeries® servers can incorporate and use one or more aspects of the present invention. Further, the environment may include more than two native processors or just one native processor. Moreover, operating systems other than those mentioned herein can be used. Further, the processing environment can emulate environments other than the z/Architecture®. Yet further, the architected features may be those of other architectures. Additionally, various emulators can be used. Emulators are commercially available and offered by various companies. Additional details relating to emulation are described in *Virtual Machines: Versatile Platforms For Systems and Processes* (*The Morgan Kaufmann Series in Computer Architecture and Design*), Jim Smith and Ravi Nair, Jun. 3, 2005, which is hereby incorporated herein by reference in its entirety. Yet further, the processing environment need not include emulator code. Many other types of processing environments can incorporate and/or use one or more aspects of the present invention.

Even though in one embodiment described herein the CPU initiates a communication with an I/O process, in other embodiments, an I/O process or other process may initiate the communication. Additionally, the communication may request operations other than a start to be performed.

Moreover, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating communication within a processing environment, the computer program product comprising:
   a storage medium readable by a processor and storing instructions for execution by the processor for performing a method comprising:
      initiating communication between a processor and an input/output (I/O) process; and
      communicating between the processor and the I/O process, wherein the communicating comprises enqueuing information on a shared queue absent use of a lock, wherein the shared queue is a lockless queue, and said enqueuing comprises enqueuing an interrupt on the lockless queue.

2. The computer program product of claim 1, wherein the method further comprises updating shared information absent use of a lock, the updating comprises updating a lockless control block, said lockless control block including said shared information and being associated with the I/O process.

3. The computer program product of claim 2, wherein the lockless control block comprises a status pending indicator, one or more interrupt pending indicators and status.

4. The computer program product of claim 2, wherein the updating comprises:
   copying an anchor of the lockless control block;
   copying contents of the lockless control block;
   modifying contents of the lockless control block;
   creating another anchor, said another anchor being associated with the modified control block; and
   comparing the anchor of the lockless control block prior to copying with the copied anchor and swapping the modified anchor with the copied anchor, in response to a successful compare.

5. The computer program product of claim 4, wherein the anchor comprises a unique sequence number used during the comparing.

6. The computer program product of claim 1, wherein the enqueuing comprises:
   determining whether a tail of the lockless queue is consistent; and
   updating a next pointer and a tail pointer of the lockless queue in a defined order, in response to the determining indicating a consistent tail.

7. The computer program product of claim 6, wherein a successful update to the tail pointer indicates the process performing the update enqueued the interrupt, and an unsuccessful update to the tail pointer indicates another process enqueued the interrupt.

8. The computer program product of claim 1, wherein the method further comprises updating shared information absent use of a lock, and wherein the updating of shared information is performed a plurality of times during the communication to present status, but the enqueuing is not performed if the interrupt is already on the lockless queue.

9. The computer program product of claim 8, wherein the updating multiple times comprises including the additional status to be presented.

10. The computer program product of claim 1, wherein the method further comprises dequeuing information from the shared queue during the communication, the dequeuing being attempted by one or more processors, but being completed by one processor of the one or more processors.

11. The computer program product of claim 1, wherein the processor comprises an emulated central processing unit process and the I/O process comprises an emulated subchannel process, said emulated subchannel process representing at least one I/O device of the processing environment.

12. The computer program product of claim 1, wherein the initiating comprises initiating communication from the processor to the I/O process, and wherein the communicating comprises:
   updating, by the processor, a lockless control block, said lockless control block including shared information to be updated;
   signaling by said processor the I/O process;
   determining by the I/O process an operation to be performed;
   updating by the I/O process the lockless control block;
   performing the operation by the I/O process;
   presenting status to the processor by the I/O process, said presenting status including updating the lockless control block, enqueuing an interrupt on the shared queue, and setting a pending interrupt indicator for one or more processors of the processing environment; and
   attempting to handle the interrupt by one or more processors of the processing environment, wherein the attempting to handle includes dequeuing the interrupt from the shared queue, attempting to modify the lockless control block, determining whether the interrupt is to be taken, and performing the interrupt, in response to the determining indicating that the interrupt is to be taken.

13. A method of facilitating communication within a processing environment, said method comprising:
   initiating communication between a processor and an input/output (I/O) process; and
   communicating between the processor and the I/O process, wherein the communicating comprises enqueuing information on a shared queue absent use of a lock, wherein the shared queue is a lockless queue, and said enqueuing comprises enqueuing an interrupt on the lockless queue.

14. The method of claim 13, further comprising updating shared information absent use of a lock, wherein the updating comprises updating a lockless control block that includes said shared information, said updating comprising:
   copying an anchor of the lockless control block;
   copying contents of the lockless control block;
   modifying contents of the lockless control block;
   creating another anchor, said another anchor being associated with the modified control block; and
   comparing the anchor of the lockless control block prior to copying with the copied anchor and swapping the modified anchor with the copied anchor, in response to a successful compare.

15. The method of claim 13, wherein the enqueuing comprises:
   determining whether a tail of the lockless queue is consistent; and
   updating a next pointer and a tail pointer of the lockless queue in a defined order, in response to the determining indicating a consistent tail.

16. The method of claim 13, further comprising updating shared information absent use of a lock, wherein the updating of shared information is performed a plurality of times during the communication to present status, but the enqueuing is not performed if the interrupt is already on the lockless queue.

17. The method of claim 13, further comprising dequeuing information from the shared queue during the communication, the dequeuing being attempted by one or more processors, but being completed by one processor of the one or more processors.

18. The method of claim 13, wherein the initiating comprises initiating communication from the processor to the I/O process, and wherein the communicating comprises:
   updating, by the processor, a lockless control block, said lockless control block including shared information to be updated;
   signaling by said processor the I/O process;
   determining by the I/O process an operation to be performed;
   updating by the I/O process the lockless control block;
   performing the operation by the I/O process;
   presenting status to the processor by the I/O process, said presenting status including updating the lockless control block, enqueuing an interrupt on the shared queue, and setting a pending interrupt indicator for one or more processors of the processing environment; and
   attempting to handle the interrupt by one or more processors of the processing environment, wherein the attempting to handle includes dequeuing the interrupt from the shared queue, attempting to modify the lockless control block, determining whether the interrupt is to be taken, and performing the interrupt, in response to the determining indicating that the interrupt is to be taken.

19. A computer system for facilitating communication within a processing environment, the computer system comprising:
   a memory; and
   a processor in communications with the memory, wherein the computer system is capable of performing a method, said method comprising:
      initiating communication between a processor and an input/output (I/O) process; and
      communicating between the processor and the I/O process, wherein the communicating comprises enqueuing information on a shared queue absent use of a lock, wherein the shared queue is a lockless queue, and said enqueuing comprises enqueuing an interrupt on the lockless queue.

20. The computer system of claim 19, wherein the method further comprises updating shared information absent use of a lock, wherein the shared information is included in a lockless control block, and wherein the updating comprises:
   copying an anchor of the lockless control block;
   copying contents of the lockless control block;
   modifying contents of the lockless control block;
   creating another anchor, said another anchor being associated with the modified control block; and
   comparing the anchor of the lockless control block prior to copying with the copied anchor and swapping the modified anchor with the copied anchor, in response to a successful compare.

21. The computer system of claim 19, wherein the enqueuing comprises:
   determining whether a tail of the lockless queue is consistent; and
   updating a next pointer and a tail pointer of the lockless queue in a defined order, in response to the determining indicating a consistent tail.

22. The computer system of claim 19, wherein the method further comprises updating shared information absent use of a lock, and wherein the updating of shared information is performed a plurality of times during the communication to present status, but the enqueuing is not performed if the interrupt is already on the lockless queue.

23. The computer system of claim 19, wherein the method further comprises dequeuing information from the shared queue during the communication, the dequeuing being attempted by the one or more processors, but being completed by one processor of the one or more processors.

* * * * *